United States Patent
Okada

(10) Patent No.: US 11,286,196 B2
(45) Date of Patent: Mar. 29, 2022

(54) OPTICAL FIBER MANUFACTURING METHOD AND OPTICAL FIBER MANUFACTURING APPARATUS

(71) Applicant: Fujikura Ltd., Tokyo (JP)

(72) Inventor: Kenji Okada, Suzuka (JP)

(73) Assignee: FUJIKURA LTD., Tokyo (JP)

( * ) Notice: Subject to any disclaimer, the term of this patent is extended or adjusted under 35 U.S.C. 154(b) by 144 days.

(21) Appl. No.: 16/811,336

(22) Filed: Mar. 6, 2020

(65) Prior Publication Data

US 2020/0290919 A1    Sep. 17, 2020

(30) Foreign Application Priority Data

Mar. 12, 2019   (JP) .............................. JP2019-044928

(51) Int. Cl.
*C03B 37/03*   (2006.01)
*C03C 25/104*  (2018.01)

(52) U.S. Cl.
CPC .......... *C03B 37/032* (2013.01); *C03C 25/104* (2013.01); *C03B 2205/40* (2013.01)

(58) Field of Classification Search
CPC ..... C03B 37/032; C03C 25/104; C03C 25/24; C03C 25/18
See application file for complete search history.

(56) References Cited

U.S. PATENT DOCUMENTS

| | | | | |
|---|---|---|---|---|
| 5,073,179 A | * | 12/1991 | Yoshimura | .......... C03B 37/0253 65/382 |
| 2002/0069674 A1 | * | 6/2002 | Guy | ........................ C03B 37/07 65/377 |
| 2005/0126227 A1 | * | 6/2005 | Collaro | .................. G01M 11/37 65/378 |
| 2006/0147166 A1 | * | 7/2006 | Roba | ...................... B65H 49/02 385/123 |

FOREIGN PATENT DOCUMENTS

| | | |
|---|---|---|
| JP | H6-263471 A | 9/1994 |
| JP | H10-182181 A | 7/1998 |
| JP | 2003-212588 A | 7/2003 |
| JP | 2012-013338 A | 1/2012 |
| JP | 2018-058725 A | 4/2018 |

* cited by examiner

*Primary Examiner* — Cynthia Szewczyk
(74) *Attorney, Agent, or Firm* — Osha Bergman Watanabe & Burton LLP

(57) ABSTRACT

An optical fiber manufacturing method includes: coating an outer periphery of a bare optical fiber with a resin before curing by a coating device; and curing the resin with a coating curing device. The following equations are satisfied: $t \times \sin\theta > T1 \times \tan\theta$ and $\theta = \tan^{-1}(d/L)$, where T1 is a tension in the upstream of the coating device, t is the shear force applied to the bare optical fiber by the resin, d is the design maximum value of a deviation amount of an entry position of the bare optical fiber into the resin in the coating device with respect to the center axis of the die hole of the coating device, and L is the contact length between the resin and the bare optical fiber in the coating device along the center axis.

19 Claims, 3 Drawing Sheets

OPTICAL FIBER MANUFACTURING METHOD AND OPTICAL FIBER MANUFACTURING APPARATUS

CROSS-REFERENCE TO RELATED APPLICATIONS

This application claims priority to Japanese Patent Application No. 2019-044928, filed on Mar. 12, 2019, the content of which is incorporated herein by reference.

BACKGROUND

Technical Field

The present invention relates to an optical fiber manufacturing method, and an optical fiber manufacturing apparatus.

Japanese Unexamined Patent Application, First Publication No. 2018-58725 discloses an optical fiber manufacturing method including a step of coating an outer periphery of a bare optical fiber with a resin by a coating device; and a step of curing the resin by a coating curing device to obtain an optical fiber. Japanese Unexamined Patent Application, First Publication No. 2018-58725 discloses adjusting the position and inclination of a coating device to reduce the eccentricity (eccentric amount) of a coating layer.

When adjusting the position and inclination of a coating device, the configuration of the manufacturing apparatus becomes complicated.

SUMMARY

One or more embodiments of the present invention provide an optical fiber manufacturing method or an optical fiber manufacturing apparatus capable of reducing the eccentricity of a coating layer with a simpler configuration.

An optical fiber manufacturing method according to one or more embodiments of the present invention includes coating an outer periphery of a bare optical fiber with a resin before curing by a coating device, and curing the resin by a coating curing device, wherein, $t \times \sin \theta > T1 \times \tan \theta$ is satisfied when a tension applied to the bare optical fiber in an upstream of the coating device is set to T1 (N), a shear force applied to the bare optical fiber by the resin in the coating device is set to t (N), a design maximum value of a deviation amount of an entry position of the bare optical fiber into the resin in the coating device with respect to a center axis of a die hole of the coating device is set to d (mm), a contact length between the resin and the bare optical fiber in the coating device in an up-down direction is set to L (mm), and $\theta = \tan^{-1} (d/L)$.

Further, an optical fiber manufacturing apparatus according to one or more embodiments of the present invention includes a coating device that coats an outer periphery of a bare optical fiber with a resin before curing; a coating curing device that is configured to cure the resin; a first tension measurement unit that is configured to measure a tension T1 (N) applied to the bare optical fiber in an upstream of the coating device; and a shear force measurement unit that is configured to measure a shear force t (N) applied to the bare optical fiber by the resin in the coating device, wherein, $t \times \sin \theta > T1 \times \tan \theta$ is satisfied, when a design maximum value of a deviation amount of an entry position of the bare optical fiber into the resin in the coating device with respect to a center axis of a die hole of the coating device is set to d (mm), a contact length between the resin and the bare optical fiber in the coating device in an up-down direction is set to L (mm), and $\theta = \tan^{-1} (d/L)$.

According to one or more embodiments of the present invention, it is possible to provide an optical fiber manufacturing method or an optical fiber manufacturing apparatus capable of reducing the eccentricity of a coating layer with a simple configuration.

DETAILED DESCRIPTION

Hereinafter, an optical fiber manufacturing method and an optical fiber manufacturing apparatus of one or more embodiments will be described with reference to the drawings.

Figure 1:
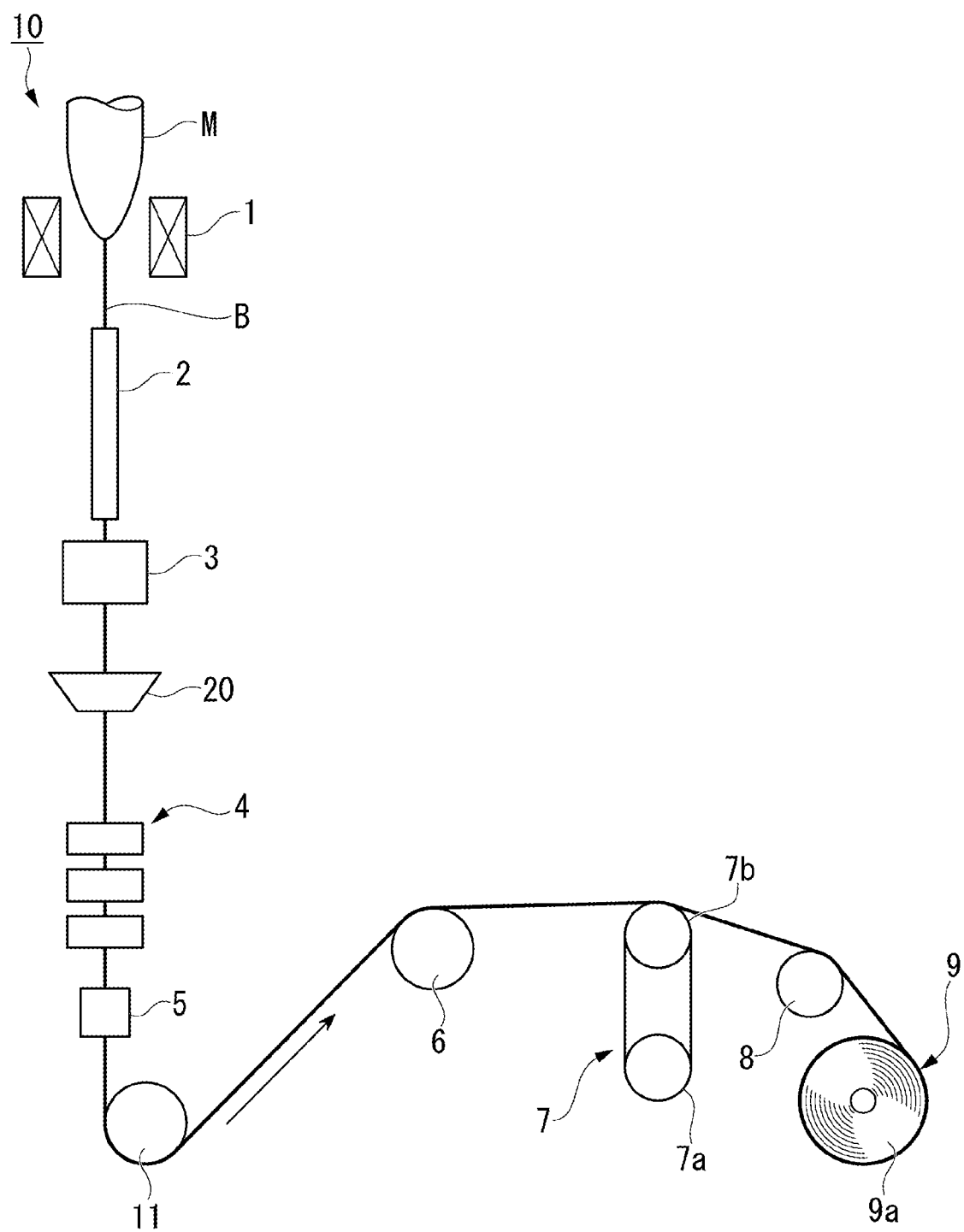
FIG. 1 is a schematic view of an optical fiber manufacturing apparatus according to one or more embodiments.

As shown in FIG. 1, an optical fiber manufacturing apparatus (hereinafter, referred to as a manufacturing apparatus 10) includes a heater 1, a cooling device 2, a first tension measurement unit 3, a coating device 20, a coating curing device 4, a second tension measurement unit 5, a take-up unit 6, a dancer unit 7, a final pulley 8, and a winding device 9. The optical fiber is manufactured by drawing from the optical fiber preform M by the manufacturing apparatus 10.

The heater 1 heats and melts the optical fiber preform M inserted into the heating furnace to about 2000° C. or higher. The cooling device 2 cools the bare optical fiber B drawn from the optical fiber preform M. Note that the bare optical fiber B may be cooled by natural cooling without using the cooling device 2. The first tension measurement unit 3 is provided upstream of the coating device 20. The first tension measurement unit 3 measures the tension T1 applied to the bare optical fiber B in an upstream of the coating device 20. As the first tension measurement unit 3, for example, a non-contact type tensiometer can be used.

Figure 2:
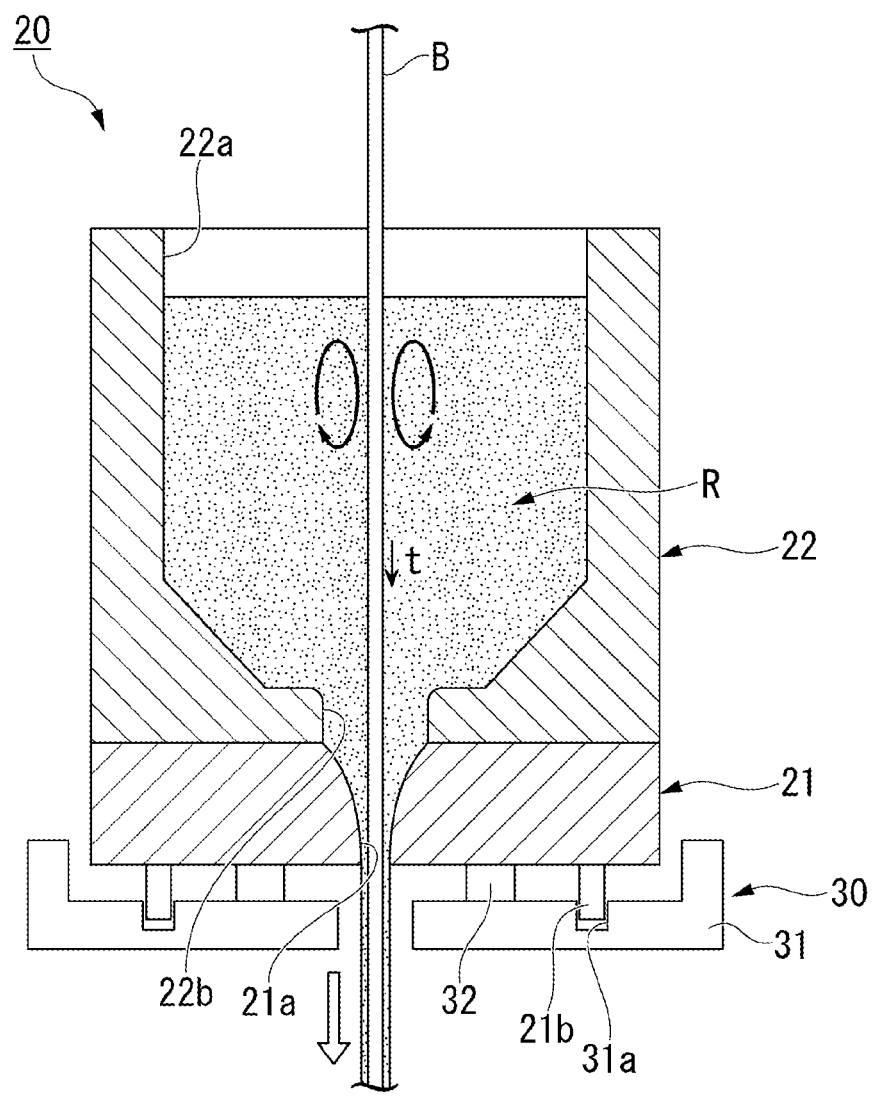
FIG. 2 is a schematic view showing an example of a coating device of FIG. 1.

The coating device 20 coats the outer periphery of the bare optical fiber B with a coating layer such as a UV curable resin. As shown in FIG. 2, the coating device 20 has a die 21 and a resin reservoir 22. The die 21 has a die hole 21a. Inside the resin reservoir 22, a resin R having fluidity before curing is stored. The resin reservoir 22 has an opening 22a opening upward and an outlet 22b opening downward. The outlet 22b communicates with the die hole 21a. Further, a resin supply pipe (not shown) is connected to the resin reservoir 22, and a liquid resin R is supplied to the resin reservoir 22 through the resin supply pipe as appropriate.

The configuration of the coating device 20 can be changed as appropriate. For example, the coating device 20 may have a nipple that closes the opening 22a of the resin reservoir 22. In the center of the nipple, a through hole in the up-down direction for introducing the bare optical fiber B into the coating device 20 is usually provided. When such a nipple is provided, since the resin R is pressed between the nipple and the die 21, a pressure type coating device is provided.

The bare optical fiber B enters the coating device 20 through the opening 22a of the resin reservoir 22 and comes into contact with the resin R. On the surface of the bare optical fiber B, the resin R flows downward together with the bare optical fiber B toward the die hole 21a. Due to this flow, convection of the resin R occurs in the resin reservoir 22. Convection may be generated in the resin reservoir 22 by the resin R flowing into the resin reservoir 22 from the resin supply pipe. The bare optical fiber B in contact with the resin R passes through the outlet 22b of the resin reservoir 22 and the die hole 21a of the die 21 and travels downward from the coating device 20. At this time, a coating layer of the resin R having a thickness corresponding to the size of the die hole 21a is provided on the outer periphery of the bare optical fiber B.

In FIG. 2, one type of resin R is provided on the outer periphery of the bare optical fiber B, but a coating device 20 which collectively provides two or more types of resin (a primary layer and a secondary layer) on the outer periphery of the bare optical fiber B may be employed. Alternatively, after forming a primary layer with the first coating device 20 and curing the primary layer with the first coating curing device 4, a secondary layer is formed with the second coating device, and the secondary layer may be cured with the second coating curing device. That is, the manufacturing apparatus 10 may include a plurality of coating devices and a plurality of coating curing devices.

As shown in FIG. 2, a shear force measurement unit 30 is provided below the coating device 20. The shear force measurement unit 30 has a die holder 31 and a pressure sensor 32.

The die holder 31 is fixed to the manufacturing apparatus 10. A positioning hole 31a is formed in the die holder 31. A positioning pin 21b projecting downward from the die 21 is inserted into the positioning hole 31a. The positioning pin 21b is slidable in the up-down direction with respect to the positioning hole 31a. The pressure sensor 32 is disposed between the die holder 31 and the die 21.

When the bare optical fiber B passes through the resin R in the coating device 20, a shear force t is generated in the resin due to the viscosity of the resin. The shear force t acts as a resistance force when the bare optical fiber B passes through the coating device 20 downward. The resistance force is detected by the pressure sensor 32 because the bare optical fiber B is forced to travel downward. The shear force t can be calculated from the resistance force detected by the pressure sensor 32.

As shown in FIG. 1, the resin coated by the coating device 20 is cured by the coating curing device 4. When the resin R is a UV curable resin, the coating curing device 4 is a UV irradiator or the like. In the present specification, a state in which the cured resin R is provided on the outer periphery of the bare optical fiber B is referred to as an optical fiber.

The second tension measurement unit 5 is provided downstream of the coating device 20 and the coating curing device 4. The second tension measurement unit 5 measures the tension T2 of the optical fiber downstream of the coating curing device 4. The second tension measurement unit 5 may be a contact tensiometer or a non-contact tensiometer. A direction changer 11 is provided downstream of the second tension measurement unit 5. Note that the second tension measurement unit 5 may be provided between the direction changer 11 and the take-up unit 6.

The take-up unit 6 is, for example, a take-up capstan, and the drawing speed is determined by the take-up unit 6. The drawing speed is, for example, 2000 msec or more.

The dancer unit 7 is located between the take-up unit 6 and the final pulley 8. The dancer unit 7 includes a fixed pulley 7b whose position is fixed, and a dancer pulley 7a that is displaced with respect to the fixed pulley 7b. In the dancer unit 7, the optical fiber is wound around the fixed pulley 7b and the dancer pulley 7a. The dancer unit 7 corrects the difference between the take-up speed of the take-up unit 6 that determines the drawing speed and the winding speed of the bobbin 9a.

The optical fiber is guided to a winding device 9 by the final pulley 8 and wound on the bobbin 9a. Thereby, the manufacture of the optical fiber is completed.

Figure 3:
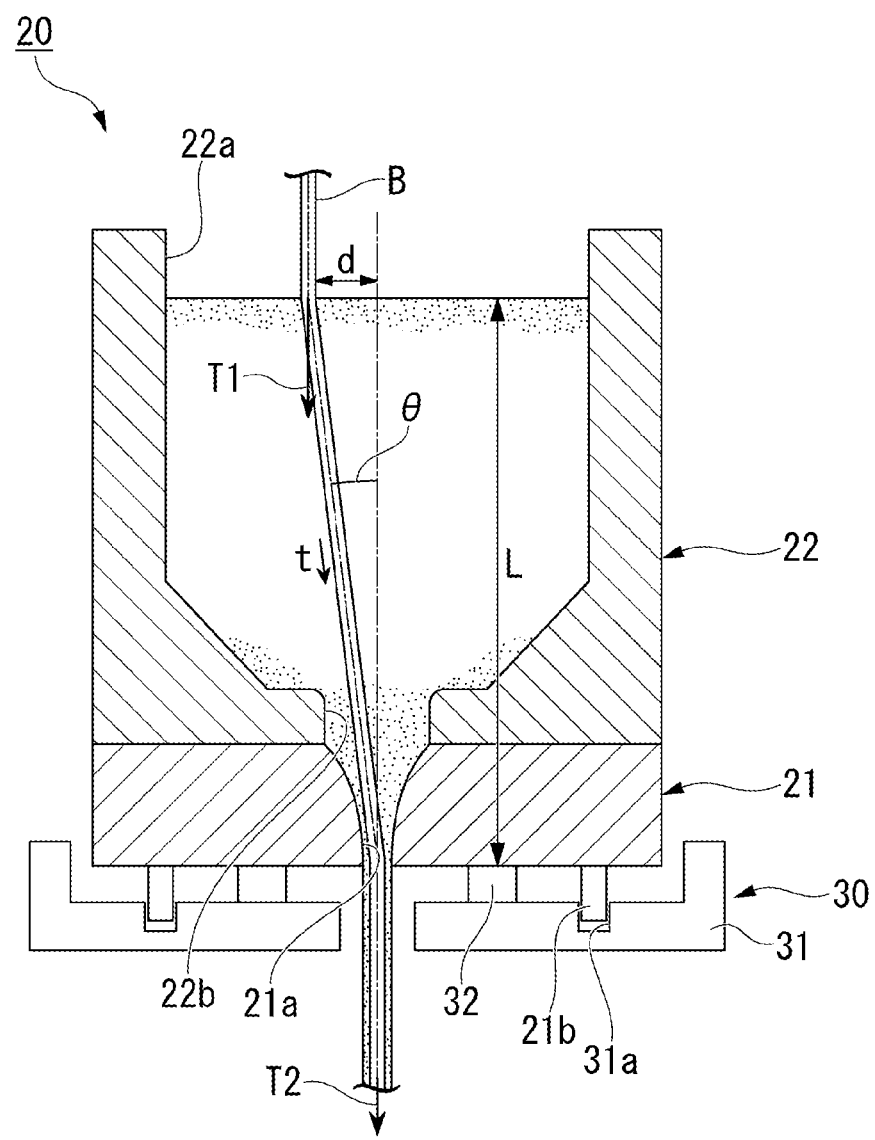
FIG. 3 is a schematic view showing a state in which an entry position of a bare optical fiber into a resin is deviated from a center axis of a die hole in the coating device of FIG. 2.

FIG. 2 shows a state in which the entry position of the bare optical fiber B into the resin R in the coating device 20 is ideal. That is, the pass line of the bare optical fiber B is located on the center axis of the die hole 21a. However, actually, as shown in FIG. 3, a deviation occurs between the entry position of the bare optical fiber B into the resin R and the center axis of the die hole 21a. In the present specification, the designed maximum value of the deviation is referred to as a maximum deviation amount d.

The maximum deviation amount d is obtained by integrating the following deviation factors. As a cause of the deviation, a machining error of the die 21 or the die hole 21a, an error of assembling the die 21 to the coating device 20, an error of assembling the coating device 20 to the manufacturing appliance 10, a deviation of the set position of the optical fiber preform M, and the like are mentioned. That is, the deviation is caused by a design dimensional tolerance of each component of the manufacturing apparatus 10 and a design assembling tolerance of each component when the manufacturing apparatus 10 is assembled.

As described above, the maximum deviation amount d can be obtained by integrating the inevitable tolerances and errors. The value of the maximum deviation amount d is a value larger than 0. That is, d>0.

Here, even when the entry position of the bare optical fiber B into the resin R is deviated as shown in FIG. 3, the bare optical fiber B is located at the center of the die hole 21a at the exit of the coating device 20. Thus, the eccentricity of the coating layer of the optical fiber can be suppressed.

As a result of intensive studies by the present inventors, the manufacturing conditions of the optical fiber satisfies the predetermined relational expression, so it has been found that the eccentricity of the coating layer of the optical fiber can be suppressed. This will be described in more detail below.

First, the centering force that the bare optical fiber B receives from the resin R in the resin reservoir 22 will be described. As the drawing speed of the bare optical fiber B and the viscosity of the resin R increase, the resistance force acting on the bare optical fiber B by the resin R increases. Further, when the drawing speed increases, the amount of the resin R exiting from the die hole 21a per unit time also increases, so the flow rate of the resin R in the coating device 20 also increases. The nearer the bare optical fiber B, the greater the increase in the flow rate. The farther the bare optical fiber B, the smaller the increase in the flow rate. In other words, the flow rate difference of the resin R increases in the radial direction of the die 21 (the direction crossing the die hole 21a in plan view, hereinafter, referred to as the die radial direction). As described above, when the flow rate difference in the die radial direction increases, the vector component of the stress of the resin R toward the inside in the die radial direction increases. Further, even when the viscosity of the resin R increases, the vector component of the stress of the resin R toward the inside in the die radial direction increases.

It is considered that the vector component of the stress of the resin R, generated as described above, toward the inside in the die radial direction acts on the entire circumference of the bare optical fiber B in the die radial direction. That is, the vector component acts as a centering force for moving the position of the bare optical fiber B to the center of the die hole 21a. The present inventors have experimentally found that there is a relationship between the centering force and a horizontal component of a shear force t acting between the resin R and the bare optical fiber B.

On the other hand, a tension T1 acts on the bare optical fiber B as shown in FIG. 3. As the tension T1 is larger, the bare optical fiber B tends to stay in place against the centering force. Therefore, in order to move the bare optical fiber B to the center of the die hole 21a at the exit of the coating device 20 when the entry position of the bare optical fiber B into the resin R is deviated as shown in FIG. 3, the condition is that the centering force by the resin R is larger than the horizontal component by the tension T1.

In order to obtain the above conditions, each parameter in the manufacturing apparatus 10 is set as follows. d, T1, θ, L, and t are shown in FIG. 3.

d (mm): the maximum deviation amount described above

T1 (N): Tension applied to the bare optical fiber in an upstream of the coating device 20

θ (rad): the maximum angle between the center axis of the die hole 21a and the bare optical fiber B L (mm): Design contact length between the bare optical fiber B and the resin R in the coating device 20 in the up-down direction t (N): Shear force applied by resin R to bare optical fiber B F(N): Force of the bare optical fiber B tends to stay in place due to the tension T1

At the entry position of the bare optical fiber B into the resin R in the coating device 20, a meniscus (a bent surface of the resin R generated at the interface between the resin R and the air) is generated. Since the size of the meniscus is sufficiently smaller than the defined contact length L, it may be ignored.

As is clear from FIG. 3, the relationship of $\theta = \tan^{-1}(d/L)$ is established.

The magnitude of the force F can be expressed by the following Expression (2) using the tension T1 and the maximum angle θ.

$$F = T1 \times \tan \theta \quad (2)$$

The inventors of the present application have studied and found that $t \times \sin \theta$, which is a horizontal component of the shear force t, approximates the magnitude of the centering force described above.

That is, the condition for suppressing the eccentricity of the coating layer of the optical fiber is to satisfy the following Expression (3).

$$t \times \sin \theta > F \quad (3)$$

Expression (3) means that the centering force by the resin R is larger than the force F by which the bare optical fiber B tends to stay in place due to the tension T1.

By substituting Expressions (1) and (2) into Expression (3), the following Expression (4) is obtained.

$$t \times \sin \theta > T1 \times \tan \theta \quad (4)$$

As described above, the eccentricity of the coating layer of the optical fiber can be suppressed by setting the magnitude of the tension T1, the shear force t, and the maximum angle θ so as to satisfy Expression (4).

As a method of adjusting the magnitude of the tension T1, for example, a method of adjusting a current applied to the heater 1 can be mentioned. When the current applied to the heater 1 is increased or decreased, the viscosity of the bare optical fiber B drawn from the optical fiber preform M is increased or decreased, so the tension T1 can be changed. More specifically, when the current applied to the heater 1 is increased, the viscosity of the bare optical fiber B drawn from the optical fiber preform M decreases, and the tension T1 decreases. Conversely, when the current applied to the heater 1 is reduced, the tension T1 increases.

As a method of adjusting the magnitude of the shear force t, a method of adjusting the viscosity of the resin R in the coating device 20 is an exemplary example. For example, when the temperature of the resin R is increased or decreased, the viscosity of the resin R is increased or decreased. Therefore, the shear force t applied to the bare optical fiber B by the resin R also changes.

Further, for example, when the contact length L is increased, the contact area between the resin R and the bare optical fiber B increases, so the shear force t by the resin R also increases. Further, since $\theta = \tan^{-1}(d/L)$, the maximum angle θ can be adjusted by changing the contact length L. As a method of changing the contact length L, a method of adjusting the height of the liquid surface of the resin R by increasing or decreasing the amount of the resin R in the coating device 20 is an exemplary example. Alternatively, the contact length L can be changed by changing the shape of the die 21 or the resin reservoir 22 of the coating device 20.

Adjustment of the tension T1, the shear force t, and the maximum angle θ may be performed by setting conditions in an experiment in advance and reflecting the result in setting conditions for product manufacturing, before starting manufacturing of an optical fiber product. In this case, the values of the tension T1, the shear force t, and the maximum angle θ may be fixed when the optical fiber is actually manufactured.

Alternatively, when manufacturing the optical fiber, the tension T1 and the shear force t are measured in real time, and the values of the tension T1, the shear force t, and the maximum angle θ may be changed with time so as to satisfy Expression (4). In this case, the manufacturing apparatus 10 may include a control unit that adjusts at least one of the tension T1, the shear force t, and the maximum angle θ so as to satisfy Expression (4).

As described above, an optical fiber manufacturing method of one or more embodiments includes coating an outer periphery of a bare optical fiber with a resin R before curing by the coating device 20, and curing the resin R by the coating curing device 4. The tension applied to the bare optical fiber B in the upstream of the coating device 20 is set to T1 (N), the shear force applied to the bare optical fiber B by the resin R in the coating device is set to t (N), the design maximum value of a deviation amount of an entry position of the bare optical fiber B into the resin R with respect to the center axis of the die hole 21a of the coating device 20 is set to d (mm), the contact length between the resin R and the bare optical fiber B in the up-down direction in the coating device 20 is set to L (mm), and $\theta = \tan^{-1}(d/L)$.

At this time, by setting each parameter so as to satisfy $t \times \sin \theta > T1 \times \tan \theta$, the centering force generated by the liquid resin R in the coating device 20 can be used to correct the pass line of the bare optical fiber B. Therefore, even when the pass line deviates from the ideal position due to various errors, the position of the bare optical fiber B at the exit of the coating device 20 is moved toward the center of the die hole 21a, and thus eccentricity of the coating layer can be suppressed. According to this manufacturing method, for example, the structure of the manufacturing apparatus 10 can be simplified as compared with the case where the position and the inclination of the coating device 20 are corrected.

Further, in the above manufacturing method, the magnitude of the tension T1 or the shear force t may be adjusted so as to satisfy t×sin θ>T1×tan θ.

Further, in the above manufacturing method, the viscosity of the resin R in the coating device 20 may be adjusted so as to satisfy t×sin θ>T1×tan θ.

Further, in the above manufacturing method, the magnitude of the contact length L may be adjusted so as to satisfy t×sin θ>T1×tan θ.

EXAMPLES

Hereinafter, the above embodiments will be described using specific examples. Note that the present invention is not limited to the following examples.

As shown in Table 1, optical fibers are manufactured under different manufacturing conditions of Examples 1 to 5 and Comparative Examples 1 to 3, using the manufacturing apparatus 10 shown in FIG. 1. As the coating device 20, a batch coating type for batch coating the primary layer and the secondary layer is employed.

based on the Young's modulus, outer diameter, tension T1, and shear force t of the bare optical fiber B.

The field of "eccentricity (μm)" shown in Table 1 indicates an average value of the eccentricity of the coating layer, the average value of the eccentricity of the coating layer is a result obtained by measuring the optical fibers from ten optical fiber preforms manufactured under each condition. In the field of "eccentricity determination," a case where the eccentricity is smaller than 12.5 μm is OK, and a case where the eccentricity is 12.5 μm or more is NG. This criterion conforms to the standard set by the ITU-T Recommendation G652A (November 2016) as a characteristic of a single mode optical fiber for communication.

The field of "breaking frequency" shown in Table 1 indicates whether or not a breaking that reduces the manufacturing efficiency has occurred when an optical fiber is manufactured from ten optical fiber preforms under each condition. In the breaking frequency, "OK" indicates a case where no breaking has occurred or only a breaking that does not affect the manufacturing efficiency (for example, a breaking immediately after the start of drawing and before a steady state) has occurred. "NG" indicates a case where a breaking that affects the manufacturing efficiency has occurred.

TABLE 1

| | Resin temperature (° C.) | Resin viscosity (Pa · s) | d [mm] | L [mm] | θ [rad] | Tension T1 [N] | Shear force t [N] | Value of determination Expression (5) | Elongation of Bare optical fiber (%) | Eccentricity (μm) | Eccentricity determination | Breaking frequency |
|---|---|---|---|---|---|---|---|---|---|---|---|---|
| Example 1 | 40 | 1.5 | 1.16 | 20 | 0.06 | 0.98 | 1.47 | 0.03 | 0.28% | 3 | OK | OK |
| Comparative Example 1 | 40 | 1.5 | 1.16 | 20 | 0.06 | 1.96 | 1.47 | −0.03 | 0.39% | 15 | NG | OK |
| Example 2 | 30 | 2.5 | 1.16 | 20 | 0.06 | 1.96 | 2.35 | 0.02 | 0.49% | 5 | OK | OK |
| Example 3 | 40 | 1.5 | 1.16 | 30 | 0.04 | 1.96 | 2.35 | 0.02 | 0.50% | 5 | OK | OK |
| Comparative Example 2 | 40 | 1.5 | 1.16 | 10 | 0.12 | 0.98 | 0.78 | −0.02 | 0.20% | 14 | NG | OK |
| Example 4 | 40 | 1.5 | 1.16 | 10 | 0.12 | 0.49 | 0.78 | 0.03 | 0.15% | 3.5 | OK | OK |
| Comparative Example 3 | 30 | 2.5 | 1.16 | 30 | 0.04 | 1.96 | 2.94 | 0.04 | 0.56% | 2 | OK | NG |
| Example 5 | 40 | 1.5 | 2.16 | 20 | 0.11 | 0.98 | 1.47 | 0.05 | 0.28% | 6 | OK | OK |

Although not shown in Table 1, the manufacturing conditions of Examples 1 to 5 and Comparative Examples 1 to 3 are common in the following points.

Drawing speed: 2500 (m/min)
Outer diameter of bare optical fiber B: 0.125 mm
Outer diameter of primary layer: 0.2 mm
Outer diameter of secondary layer: 0.25 mm
Young's modulus of bare optical fiber B: 71 GPa The field of "resin temperature (° C.)" shown in Table 1 indicates the temperature of the resin R in the coating device 20. The field of "resin viscosity (Pa·s)" indicates the viscosity of the resin R in the coating device 20.

The field of "value of determination Expression (5)" shown in Table 1 indicates the value on the left side of the following Expression (5) obtained by modifying Expression (4).

$$t \times \sin θ - T1 \times \tan θ > 0 \quad (5)$$

That is, when the value of the determination Expression (5) is positive, it means that Expression (4) is satisfied, and when it is negative, it means that it is not satisfied.

The field of "elongation of bare optical fiber (%)" shown in Table 1 indicates the elongation percentage of the bare optical fiber in the longitudinal direction, caused by tension T1 and shear force t. The elongation percentage is calculated As shown in Table 1, in Example 1, the resin temperature is 40° C., the resin viscosity is 1.5 Pa·s, the maximum angle θ is 0.06 rad, the tension T1 is 0.98 N, and the shear force t is 1.47 N. At this time, the value of the determination expression (5) is 0.03, that is, a positive value. The eccentricity is 3 μm, and is determined to be OK. The elongation of the bare optical fiber is 0.28%, and the breaking frequency is OK.

In Comparative Example 1, the value of the tension T1 is set larger than that in Example 1. As a result, the value of the determination expression (5) is −0.03, that is, a negative value. The eccentricity is 15 μm, and is determined to be NG.

From the comparison between Example 1 and Comparative Example 1, it is confirmed that the eccentricity of the coating layer can be suppressed by setting the value of the determination Expression (5) to be positive, that is, by setting each condition so as to satisfy Expression (4).

In Example 2, the resin temperature is 30° C., the resin viscosity is 2.5 Pa·s, the maximum angle θ is 0.06 rad, the tension T1 is 1.96 N, and the shear force t is 2.35 N. At this time, the value of the determination expression (5) is 0.02, the eccentricity is 5 μm, and it is determined to be OK. The elongation of the bare optical fiber is 0.49%, and the breaking frequency is OK.

In Example 2, as compared with Comparative Example 1, the resin viscosity increases by lowering the resin temperature, so that the shear force t increases, and the value of the determination Expression (5) is a positive value. Thus, it is confirmed that the eccentricity can be suppressed by adjusting the resin viscosity.

In Example 3, the contact length L is larger than that in Example 1. Thus, the value of θ decreases. Also in this case, the value of the determination expression (5) is a positive value, and the eccentricity can be suppressed as in Example 1.

In Comparative Example 2, the contact length L is smaller than that in Example 3. Thus, the value of θ increases. In this case, the value of the determination Expression (5) is a negative value. As a result, the eccentricity is increased, and it is determined to be NG.

Comparative Example 2 has a tension T1 of 0.98 N, while Example 4 has a tension T1 of 0.49 N. As described above, by reducing the tension T1, the value of the determination expression (5) is a positive value, and the eccentricity can be suppressed as in Example 1.

In Comparative Example 3, the breaking frequency is determined to be NG. This is considered because in Comparative Example 3, the elongation percentage of the bare optical fiber B caused by the tension T1 and the shear force t is larger as compared with other conditions. The breaking frequency is OK in Examples 2 and 3 in which the elongation percentage of the bare optical fiber B is 0.49% and 0.50%, respectively, and the breaking frequency is NG in Comparative Example 3 in which the elongation percentage is 0.56%. Accordingly, it is understood that an elongation percentage of 0.50% or less is OK.

Note that, as the shear force t by the resin R increases, the value on the left side of Expression (4) increases, the condition of Expression (4) is satisfied, and the eccentricity of the coating layer is easily suppressed. On the other hand, when the shear force t is increased, breaking is likely to occur. Therefore, by setting each parameter so as to satisfy Expression (4) within a range where the elongation percentage of the bare optical fiber B caused by the tension T1 and the shear force t is 0.50% or less, the occurrence of the breaking and the eccentricity of the coating layer can be suppressed.

It should be noted that the technical scope of the present invention is not limited to the above-described embodiments, and various modifications can be made without departing from the spirit of the present invention.

For example, the manufacturing apparatus 10 in FIG. 1 includes one coating device 20 and one coating curing device 4, but the number of the coating devices 20 and the coating curing devices 4 may be plural.

That is, the manufacturing apparatus 10 may include a second coating device and a second coating curing device downstream of the first coating device 20 and the first coating curing device 4 shown in FIG. 1. In this case, assuming that a tension in the upstream of the second coating device is set to T1, the shear force of the resin in the second coating device is t, and the maximum angle in the second coating device is θ, by setting each parameter so as to satisfy Expression (4), the same effect as in the above-described embodiments can be obtained.

Further, instead of measuring the shear force t in the coating device 20 by the shear force measurement unit 30 provided at the lower part of the coating device 20, the shear force t may be calculated from the relationship between the tension T2 measured by the second tension measurement unit 5 and the tension T1 measured by the first tension measurement unit 3. In this case, the manufacturing apparatus 10 may include a shear force measurement unit that is configured to measure the shear force t from the relationship between the tension T1 and the tension T2, instead of the shear force measurement unit 30 as shown in FIG. 2.

While preferred embodiments of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

3 First tension measurement unit
4 Coating curing device
10 Manufacturing apparatus
20 Coating device
30 Shear force measurement unit
21a Die hole
B Bare optical fiber

What is claimed is:

1. An optical fiber manufacturing method comprising:
coating an outer periphery of a bare optical fiber with a resin before curing by a coating device;
curing the resin with a curing device, and
setting a tension T1 [N] applied to the bare optical fiber upstream of the coating device and a shear force t [N] applied by the resin to the bare optical fiber in the coating device so as to satisfy Equation (1):

$$t \times \sin\theta > T1 \times \tan\theta \tag{1}$$

wherein θ [rad] is defined by Equation (2):

$$\theta = \tan^{-1}(d/L) \tag{2},$$

where,
d [mm] is a design maximum value of a deviation amount of an entry position of the bare optical fiber into the resin in the coating device with respect to a center axis of a die hole of the coating device, and
L [mm] is a contact length between the resin and the bare optical fiber in the coating device along the center axis.

2. The optical fiber manufacturing method according to claim 1, further comprising:
adjusting a viscosity of the resin in the coating device to satisfy Equation (1).

3. The optical fiber manufacturing method according to claim 1, further comprising:
adjusting a magnitude of the contact length L to satisfy Equation (1).

4. The optical fiber manufacturing method according to claim 1, wherein
an elongation percentage of the bare optical fiber due to the tension T1 and the shear force t is 0.50% or less.

5. The optical fiber manufacturing method according to claim 1, wherein
the tension T1 and the shear force t are experimentally determined in advance.

6. The optical fiber manufacturing method according to claim 1, wherein
the tension T1 and the shear force t are constantly adjusted to satisfy Equation (1) in accordance to the change of condition with time.

7. An optical fiber manufacturing apparatus comprising:
a coating device that coats an outer periphery of a bare optical fiber with a resin before curing;
a curing device that cures the resin;
a first tension measurement unit that measures a tension T1 [N] applied to the bare optical fiber upstream of the coating device;
a shear force measurement unit that measures a shear force t [N] applied by the resin to the bare optical fiber in the coating device; and
a control unit that controls at least one of the tension T1 and the shear force t, and a contact length L [mm] between the resin and the bare optical fiber in the coating device in an up-down direction, wherein
the tension T1, the shear force t, and the contact length L are set by the control unit so as to satisfy Equations (1):

$$t \times \sin \theta > T1 \times \tan \theta \quad (1)$$

$$\theta = \tan^{-1}(d/L) \quad (2),$$

where, d [mm] is a design maximum value of a deviation amount of an entry position of the bare optical fiber into the resin in the coating device with respect to a center axis of a die hole of the coating device.

8. An optical fiber manufacturing method comprising:
coating an outer periphery of a bare optical fiber with a resin before curing by a coating device;
curing the resin with a curing device, and
adjusting a viscosity of the resin in the coating device to set a shear force t [N] applied by the resin to the bare optical fiber in the coating device, so as to satisfy Equation (1):

$$t \times \sin \theta > T1 \times \tan \theta \quad (1)$$

wherein T1 [N] is a tension applied to the bare optical fiber upstream of the coating device, and θ [rad] is defined by Equation (2):

$$\theta = \tan^{-1}(d/L) \quad (2),$$

where, d [mm] is a design maximum value of a deviation amount of an entry position of the bare optical fiber into the resin in the coating device with respect to a center axis of a die hole of the coating device, and
L [mm] is a contact length between the resin and the bare optical fiber in the coating device along the center axis.

9. The optical fiber manufacturing method according to claim 8, further comprising:
adjusting a magnitude of the tension T1 or the shear force t to satisfy Equation (1).

10. The optical fiber manufacturing method according to claim 8, further comprising:
adjusting a magnitude of the contact length L to satisfy Equation (1).

11. The optical fiber manufacturing method according to claim 8, wherein
an elongation percentage of the bare optical fiber due to the tension T1 and the shear force t is 0.50% or less.

12. The optical fiber manufacturing method according to claim 8, wherein
the viscosity of the resin in the coating device is experimentally determined in advance.

13. The optical fiber manufacturing method according to claim 8, wherein
the viscosity of the resin in the coating device is constantly adjusted to satisfy Equation (1) in accordance to the change of condition with time.

14. An optical fiber manufacturing method comprising:
coating an outer periphery of a bare optical fiber with a resin before curing by a coating device;
curing the resin with a curing device, and
adjusting a magnitude of a contact length L [mm] between the resin and the bare optical fiber in the coating device along a center axis of a die hole of the coating device, to set a shear force t [N] applied by the resin to the bare optical fiber in the coating device and θ [rad] that is the maximum angle between the center axis and the bare optical fiber, so as to satisfy Equations (1) and (2):

$$t \times \sin \theta > T1 \times \tan \theta \quad (1)$$

$$\theta = \tan^{-1}(d/L) \quad (2),$$

wherein T1 [N] is a tension applied to the bare optical fiber upstream of the coating device, and
d [mm] is a design maximum value of a deviation amount of an entry position of the bare optical fiber into the resin in the coating device with respect to the center axis.

15. The optical fiber manufacturing method according to claim 14, further comprising:
adjusting a magnitude of the tension T1 or the shear force t to satisfy Equation (1).

16. The optical fiber manufacturing method according to claim 14, further comprising:
adjusting a viscosity of the resin in the coating device to satisfy Equation (1).

17. The optical fiber manufacturing method according to claim 14, wherein
an elongation percentage of the bare optical fiber due to the tension T1 and the shear force t is 0.50% or less.

18. The optical fiber manufacturing method according to claim 14, wherein
the contact length L is experimentally determined in advance.

19. The optical fiber manufacturing method according to claim 14, wherein
the contact length L is constantly adjusted to satisfy Equations (1) and (2) in accordance to the change of condition with time.

* * * * *